March 25, 1924.

C. L. DUHEM

PICTURE REFLECTOR

Filed June 24, 1921

1,488,327

Inventor
C. L. Duhem
By D. Swift
Attorney

Patented Mar. 25, 1924.

1,488,327

UNITED STATES PATENT OFFICE.

CONSTANT L. DUHEM, OF OROVILLE, CALIFORNIA.

PICTURE REFLECTOR.

Application filed June 24, 1921. Serial No. 480,103.

*To all whom it may concern:*

Be it known that I, CONSTANT L. DUHEM, a citizen of the United States, residing at Oroville, in the county of Butte, State of California, have invented a new and useful Picture Reflector; and I do hereby declare the following to be a full, clear, and exact description of the invention, such as will enable others skilled in the art to which it appertains to make and use the same.

The invention relates to picture reflecting devices and has for its object to provide a device of this character comprising a horizontally disposed member adjacent the ends of which are supported pictures preferably of a person or an animal, said pictures being taken when the person or animal is in two different positions, and to provide mirrors in which said pictures are reflected, and into which mirrors the operator looks, obscuring the vision of each eye alternately thereby causing an optical illusion to make the reflected pictures simulate motion.

A further object is to provide adjacent the forward ends of the mirrors a movable member which may be manually moved from side to side for securing alternately the view of one of the operator's eyes. Also to provide a shutter of a pendulum type for alternately obscuring the view from the operator's eyes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
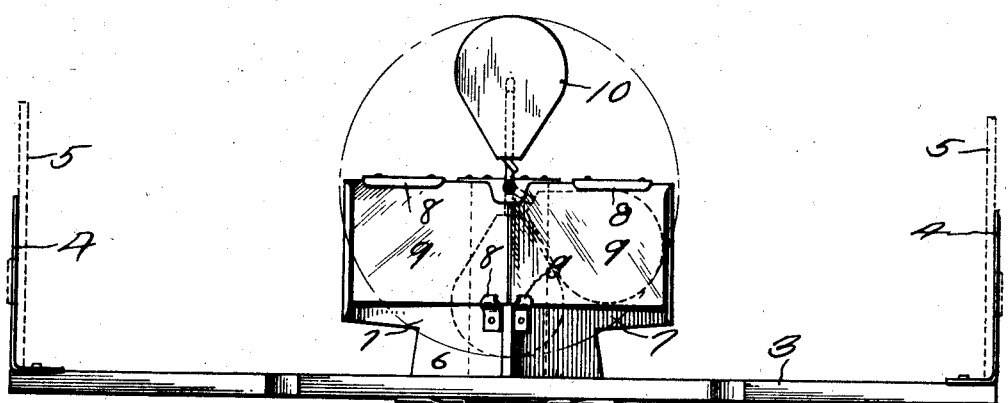
Figure 1 is a front elevation of the picture reflector.
Figure 2:
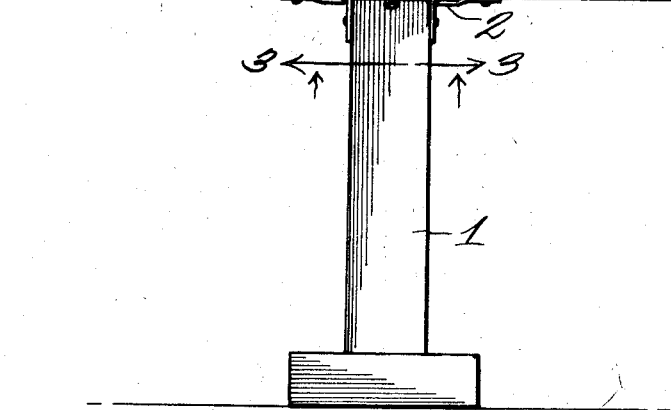
Figure 2 is a top plan view of the picture reflector.
Figure 3:
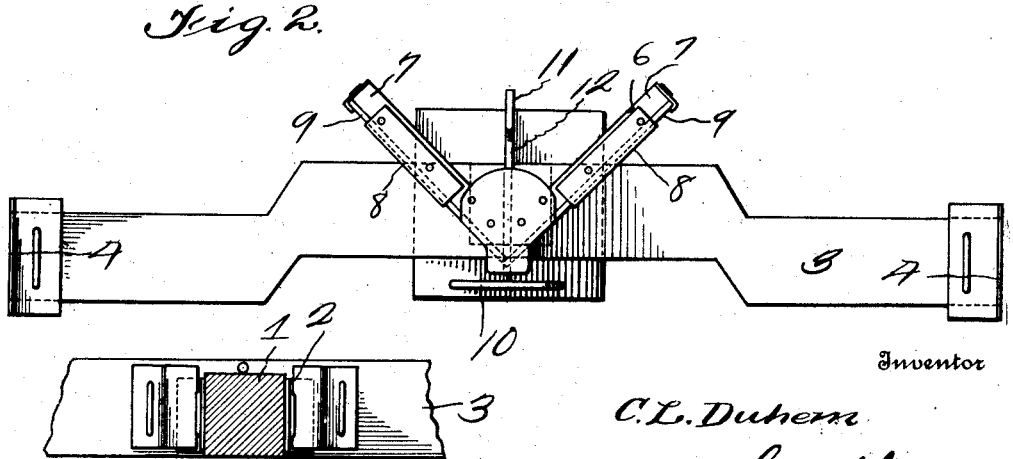
Figure 3 is a sectional view taken on line 3—3 of Figure 1, showing the means for securing the horizontal member to the vertical support.

Referring to the drawings, the numeral 1, designates a standard, to the upper end of which is detachably secured as at 2 a horizontally disposed member 3. Secured to the ends of the member 3 are picture supporting brackets 4, which brackets support pictures 5 in vertical position as shown in dotted lines in Figure 1. Extending upwardly from the horizontally disposed member 3 at a point substantially centrally thereof is a mirror support 6, said support comprising mirror receiving members 7 which are disposed at right angles to each other in vertical planes, and are adapted to receive between clips 8 carried thereby mirrors 9, into which mirrors, the images from the pictures 5 are reflected. It will be noted that as the pictures 5 show thereon objects in different positions, for instance one of the pictures will show a person about to take a step and the other picture of the same person in the act of taking a step, therefore it will be obvious that by shutting off the view of a person's eyes alternately, which person is looking into the mirrors, will cause an illusion which will create the impression that the person is walking. To accomplish this result a shutter 10 is provided, which shutter when in the full line position shown in figure 1 will be out of the way of the operator's vision thereby allowing the operator to alternately wink his eyes for obtaining the illusion. However, a great many people find it difficult to alternately wink their eyes, and consequently the mechanical means must be provided. The mechanical means comprises the shutter 10 which may swing as a pendulum properly timed, or may be manually operated and swung from side to side by the operator grasping the crank 11 and rocking the shaft 12 on which the shutter is carried in such a manner that said shutter will alternately move into registeration with the eyes of the operator thereby obstructing the vision in such a manner that an illusion will be created, similar to a motion picture.

From the above it will be seen that a motion picture device is provided which is simple in construction and one which may be easily and cheaply constructed and used for amusement.

The invention having been set forth what is claimed as new and useful is:—

A reflecting device, said reflecting device comprising a main frame, a mirror supporting frame, mirrors supported in the mirror supporting frame in vertical planes and at right angles to each other, picture supporting means carried by the frame and spaced to opposite sides of the mirrors, said picture supporting means being positioned to support pictures in parallel relation to each other and at substantially forty-five degrees to the mirrors, a horizontally disposed shaft extending through the mirror frame centrally thereof adjacent the upper side of the frame and where the mirrors diverge from each other and between said mirrors and a shutter carried by said shaft and disposed forwardly of the mirrors.

In testimony whereof I have signed my name to this specification in the presence of two subscribing witnesses.

CONSTANT L. DUHEM.

Witnesses:
A. C. TUCKER,
B. A. SWINNEY.